Oct. 8, 1968 N. W. PARKER 3,405,230

COLOR TELEVISION DEMODULATION SYSTEM

Filed Feb. 12, 1968 2 Sheets-Sheet 1

INVENTOR.
NORMAN W. PARKER
BY Mueller, Aichele & Rauner
ATTORNEYS.

INVENTOR.
NORMAN W. PARKER

BY Mueller, Aichele & Rauner
ATTORNEYS.

United States Patent Office 3,405,230
Patented Oct. 8, 1968

3,405,230

COLOR TELEVISION DEMODULATION SYSTEM

Norman W. Parker, Wheaton, Ill., assignor to Motorola, Inc., Franklin Park, Ill., a corporation of Illinois Continuation-in-part of application Ser. No. 504,749, Oct. 24, 1965. This application Feb. 12, 1968, Ser. No. 704,620
12 Claims. (Cl. 178—5.4)

ABSTRACT OF THE DISCLOSURE

A direct demodulator for a composite color television signal operates upon both the video frequency brightness components and the chroma subcarrier. The demodulator output is a signal representing brightness, hue and saturation of a television image. Modulation of the brightness components with the demodulator control signal of subcarrier frequency, producing undesired spruious signals, is offset by action of a cancelling network.

*Cross-reference*

This application is a continuation-in-part of my application Ser. No. 504,749 filed Oct. 24, 1965.

*Background*

The presently used color television signal is comprised of brightness or luminance components in a frequency range from zero to several megacycles and a frequency and amplitude modulated subcarrier at approximately 3.58 mHz. which represents the hue and saturation of the image, i.e. "color less brightness." The brightness components and the modulated subcarrier overlap in frequency to restrict the signal bandwidth and conserve spectrum use. The interference between these signals is limited because each has energy bunches which are interleaved in the spectrum in accordance with known principles.

In many instances the chroma subcarrier is band selected and synchronously demodulated at three different phases to produce color difference signals ($R-Y$, $B-Y$ and $G-Y$) which are subsequently combined with the brightness signal (Y) to produce color representative signals (R, B and G) for controlling the picture tube. In some color television systems the composite signal is applied directly to a demodulator so that a color representative signal is directly produced without a matrixing operation, but such apparatus has not been satisfactory because spurious signals were developed and the television image was impaired by an undesired pattern from these spurious signals.

An object hereof is to directly demodulate color television signals from the composite signal, while avoiding the production of spurious signal components.

Another object is to improve a color television receiver and render the receiver more readily produced using semiconductor devices.

A further object is to reduce the number of signal conductive channels in a television receiver and to improve the correlation of the red, blue and green representative signals.

*Summary*

The system hereof is a wide band direct demodulation system for a composite color television signal which provides phase detection of a color subcarrier signal with the associated brightness signal. The subcarrier signal is modulated at various phase angles to represent saturation of a given color of the image. Three such direct, primary demodulators produce red, blue and green representative signals including the associated brightness information so that the signals can be directly applied to a color picture tube. Since the brightness signal components extend in frequency up to and generally into the frequency range of the subcarrier modulation band, these components modulate with the subcarrier demodulation or reference signal to produce a lower modulation sideband of that signal which falls in the frequency range from the color subcarrier down into the color representative signals. These spurious signals are reduced or eliminated through a balancing or cancelling action provided by a secondary demodulator which is controlled by a signal phase locked to the subcarrier and modulated by the video frequency brightness components. The output of this secondary demodulator is applied in proper phase and amplitude to the primary demodulator circuitry in order to cancel and offset the spurious signals produced therein. The complete demodulation system further includes provision for modifying the ratio of the brightness components to color information components to compensate for selected ratios which may be used in transmission of the signal in order to promote compatibility of the brightness signal components for reproduction by monochrome television receivers.

*The drawing*

*Embodiments*

Figures 1, 2, 3:
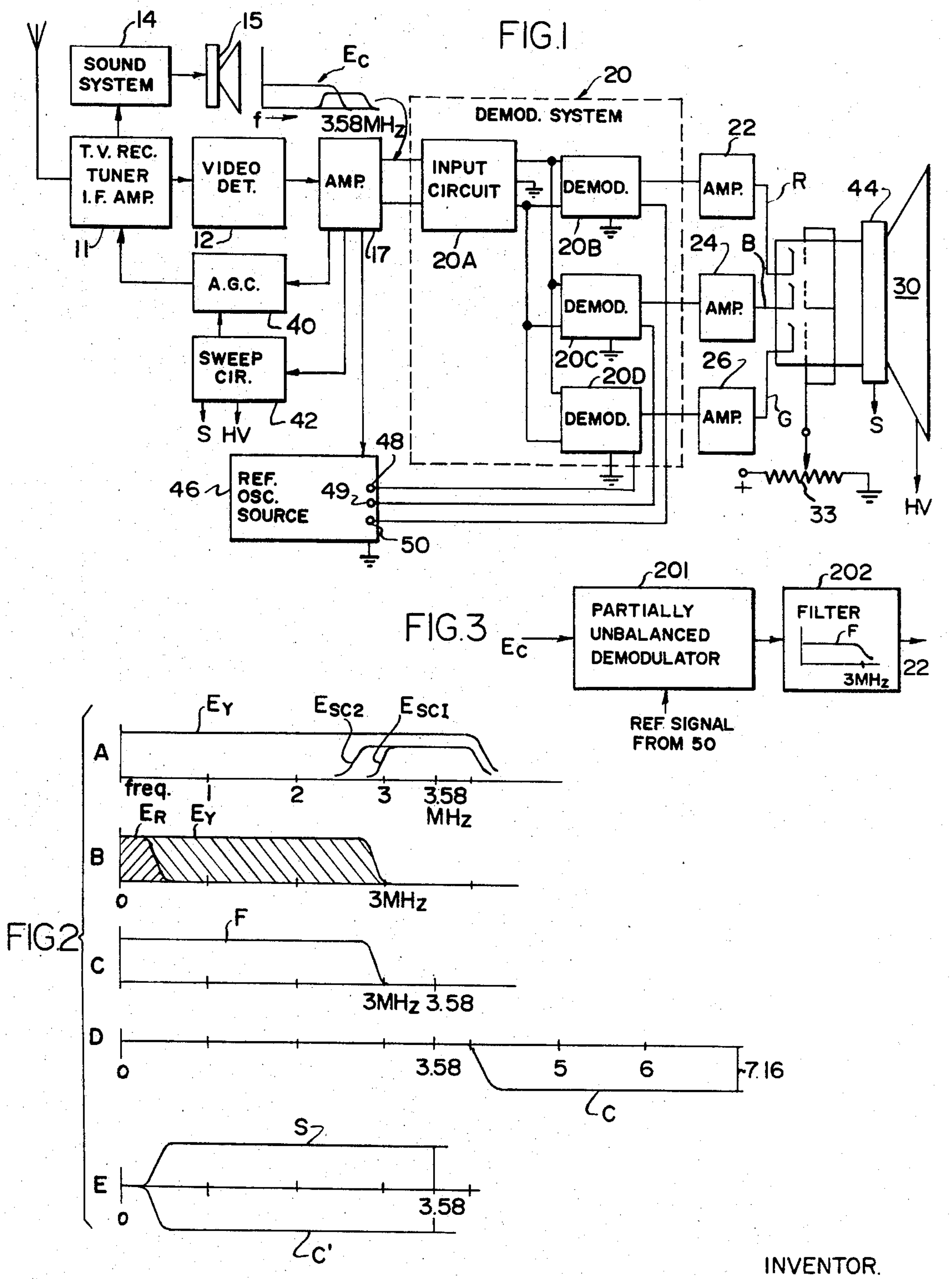
FIG. 1 is a block diagram of a color television receiver in which the invention may be used.
FIG. 2 is a series of frequency response curves useful in explaining color television signal demodulation.
FIG. 3 is a block diagram of a demodulator useful in explaining demodulation in a color television receiver.

The color television receiver of FIG. 1 includes tuner and IF amplifier stages 11 which provide a selected and amplified television signal and apply it to the video detector 12. Circuitry 11 also couples a signal to the sound system 14 for demodulation and amplification of the sound subcarrier to drive the loudspeaker 15.

The demodulated television signal from the video detector 12 is direct current coupled to an amplifier 17 and from there to the demodulation system 20 which provides separate red, blue and green representative signals to the respective amplifiers 22, 24 and 26. These amplifiers are individually connected to the cathodes of the tri-beam cathode ray tube 30 to individually drive the electron guns in this tube in accordance with known operation in the art for production of a composite image in color.

The image reproducer or color picture tube 30 includes a plurality of control grids which are interconnected to the arm of a potentiometer 33 to provide a fixed bias for these grids, as a so-called master brightness, or beam current control for the tube 30.

The signal amplifier 17 is also coupled to an AGC system 40 which provides a control potential that is gated from and variable with the amplitude of a received signal in order to adjust the amplification of various stages in the circuitry 11 to maintain a relatively constant amplitude of the signal derived in the video detector 12. Amplifier 17 also feeds the sweep or deflection circuitry 42 which is coupled to the deflection yoke 44 to provide suitable sawtooth scanning currents to deflect the beams of the tri-beam cathode ray tube 30 across its screen for production of the image. The horizontal sweep circuit also generates a suitable high voltage for the screen in the picture tube 30 in accordance with standard practice.

Amplifier 17 may also supply a control signal to the reference oscillator source 46 in order to generate an accurately phase controlled reference for demodulation of the suppressed carrier, chrominance modulated subcarrier of the composite television signal. As is understood in the art, the synchronizing pulses in the television signal, utilized to control the sweep circuitry 42, are also accompanied by short bursts of reference control signals at approximately 3.58 megacycles to be used for synchronization of the oscillator source 46. Three different phases of the oscillator signal will be produced at the output terminals 48, 49 and 50. For example, the signal at terminal 48 may be phased at approximately 240° with respect to the blue color difference signal, the signal at terminal 49 may be phased at approximately zero degrees and the signal at terminal 50 may be phased at approximately 97° with respect to the blue color difference signal. The exact phase angles of the reference signals at these terminals would be determined by several different variables within the receiver itself, such as the dominant color of emission of the various phosphors in the screen of the tube 30, even though the received television signal is a standard one of the NTSC type.

The signal applied to input circuit 20A of the demodulator system is illustrated in the response vs. frequency curves of FIG. 2A. The video frequency brightness components $E_Y$ extend from zero to over two mHz., and sometime as high as 3 or 4 mHz. The subcarrier wave representing chrominance or color difference information is modulated at approximately 3.58 mHz. with a component of one phase $E_{SC1}$ in a band of approximately .5 mHz. and in another phase as a vestigial sideband signal $E_{SC2}$ with a lower sideband extending below 3 mHz. Present day receivers generally use a subcarrier bandwidth of approximately .5 mHz. total for all subcarrier components and the following description will assume such operation. However it will be apparent to those skilled in the art that the principles discussed are equally applicable to deriving color components at other bandwidths.

It should further be noted that the frequency response characteristics of the various parts of the receiver can be modified and correlated in accordance with known receiver design in order to establish an overall desired video response. This correlation within the receiver need not be discussed to understand the present invention.

The NTSC signal has video frequency brightness components in the following relationship in order to improve compatibility for reception by a monochrome receiver so that its grey scale of a color image will be in accord with the brightness response of the colors by the human eye. The brightness signal is as follows:

$$(1)\qquad E_Y=0.30E_R+0.59E_G+0.11E_B$$

In this formula $E_Y$ represents a signal voltage for the luminance component of a picture element and $E_R$, $E_G$ and $E_B$ are respectively the signal voltages representing the colors red, green and blue for that picture element. The chrominance modulated subcarrier wave is represented as follows:

$$(2)\qquad E_{SC}=K_1(E_R-E_Y)\cos\omega t+K_2(E_B-E_Y)\sin\omega t$$

In terms of the green chrominance component the subcarrier can be represented as:

$$(3)\qquad E_{SC}=K_3(E_G-E_Y)\cos(\omega t+146°)+K_4\sin(\omega t+146°)$$

In the above formulas $K_1$ equals 1/1.4; $K_2$ equals 1/2.203; $K_3$ equals 1/0.70; and $K_4$ equals $$.49(E_R-E_Y)-.41(E_B-E_Y)$$

As is understood in the television art the signals are constituted for proper compatibility for monochrome reception of the signal and production of a grey scale matching the color response of the eye, as well as for a limited amplitude swing of the quadrature modulated subcarrier wave with respect to $E_Y$ in order to limit the size of the composite signal ($E_C=E_Y+E_{SC}$) for proper handling in a receiver.

FIG. 3 represents a direct color signal demodulator. The composite signal including the brightness components and the subcarrier wave is applied to the demodulator 201 which is controlled in conduction by a reference signal of the subcarrier frequency and properly phased with respect thereto. For example, the signal from terminal 50 can be used to demodulate for the red representative signal. The output of the demodulator 201 is applied to a video frequency filter 202 to establish a low pass range up to, for example, 3 mHz. to be applied to the amplifier 22 of FIG. 1 in the case of a red representative signal. As will be explained in greater detail subsequently, the demodulator 201 may be of the balanced type which is partially unbalanced to compensate for the brightness to subcarrier ratio of the composite signal. This unbalance effectively compensates for demodulator efficiency and the K factors in the equations of the signal.

An understanding of the functioning of the circuit of FIG. 3 can be had by considering the reference signal as a rectangular gating signal causing the demodulator to switch or sample the applied composite input signal by electron control means (e.g. a diode) which is essentially either conductive or nonconductive. Mathematically, the operation can be expressed by multiplying the composite color signal $E_C$ by a cyclic function having a value 1 with the electron control means closed and the value zero when the control means is open. Such a gating signal to demodulate for red information can be represented as:

$$(4)\qquad G(t)_R=\Delta T/T(1+2A_1\cos\omega t+2A_2\cos 2\omega t\ \ldots\ 2A_n\cos n\omega t)$$

where $$A_n=1/\pi\int_0^{2\pi}G(t)\cos\omega t d\omega$$

and $\Delta T/T$ is the duty cycle

For demodulating the blue signal the cosine terms become sine terms and for the green signal, the cosine angle is $\omega+146°$.

To develop the red representative signal the composite signal is multiplied by the gating function and the product is as follows:

$$(5)\qquad E_C\times G(t)_R=\Delta T/T(E_Y+K_1(E_R-E_Y)\cos\omega t+K_2(E_B-E_Y)\sin\omega t+2A_1E_Y\cos\omega t+A_1K_1(E_R-E_Y)+A_1K_1(E_R-E_Y)\cos 2\omega t+\text{components}>2\omega)$$

In Equation 5 the first and fifth terms combine (by adjusting the unbalance of demodulator 201 to control $E_Y$ since $K_1$ is less than 1 and $A_1$ cannot exceed 1) thus producing signal $E_R$ and $E_Y$ of FIG. 2B. Similar demodulation can take place for the blue and green representative signals with proper demodulator unbalance.

The second and third terms of the product in (5) are the original subcarrier components which are removed to the extent they fall outside the passband of the filter 202 as seen by comparing the passband F of FIG. 2C with the modulation range $E_{SC}$ of FIG. 2A, the wider range chrominance modulation being ignored as previously discussed. The sixth and seventh terms of the demodulation product are at twice the subcarrier frequency and higher so that they fall outside the video signal bandpass F. The fourth term represents a modulation product which is a spurious signal due to beating of the brightness signal $E_Y$ with the first order periodic component of the gating signal. Depending upon the frequency range of the brightness signal applied to the demodulator 201 (FIG. 3), the lower sideband of this spurious component S (FIG. 2E) can extend all the way from the frequency of the reference signal (3.58 m/Hz.) down to zero, and therefore throughout most or all of the video passband F. The higher the frequency of the brightness component applied to the demodulator the lower in frequency the lower sidebands will extend within the output range of filter 202.

Such a spurious signal S may have a substantial amplitude so that it appears as a pulse on the edge of a luminance change in the reproduced image. Since this spurious signal will be changing in phase with others produced by the blue and green signal demodulators this undesired portion of the image will appear to move along the luminance difference transition in the picture giving the appearance of a crawling pattern. Thus, the problem is produced when the highest frequency of the brightness signal $E_Y$ is close enough in frequency to that of the reference signal (here 3.58 mHz.) such that their modulation product, or part of it, falls within the low pass range from the demodulator to the picture tube.

The low pass filter 202 will remove the upper sideband component of the fourth term of the modulation product and the carrier thereof, but the lower sideband remains. That portion of the brightness signal $E_Y$ interleaved with the subcarrier $E_{SC}$ in FIG. 2A can be separated from the sub-carrier by known comb filter techniques. However, those signals may be tolerable in some practical systems and they are not normally removed in the present day commercial receivers. In accordance with teachings hereof the brightness components lower than the lowest selected subcarrier sidebands are prevented from generating cross color interference or spurious signal as described below. If comb filter techniques are used to separate the brightness and chrominance components the spurious signal elimination as described below can be used for the entire luminance range.

Figures 4, 5, 6:
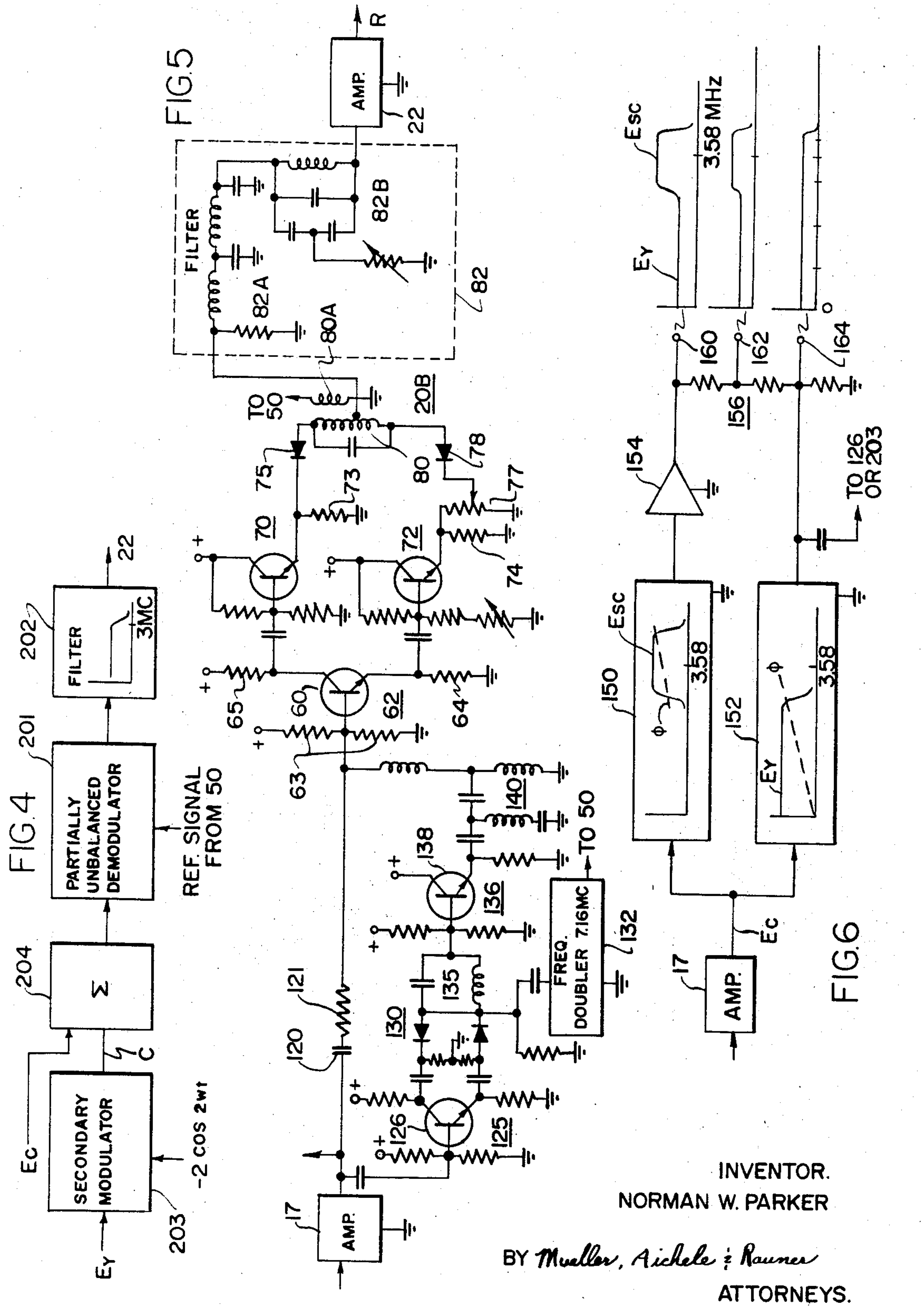
FIG. 4 is a block diagram of a demodulation system illustrating the invention.
FIG. 5 is a schematic diagram of a portion of the receiver of FIG. 1 showing a specific form of the invention.
FIG. 6 is a block diagram illustrating apparatus which may be substituted for a portion of the circuit of FIG. 5.

As shown in FIG. 4 the spurious signal S of FIG. 2E due to intermodulation of the brightness and subcarrier reference can be offset by the addition of another input signal to the primary demodulator 201 which offsets and causes balancing out of the undersired signal. To do this a product modulator 203 is fed both by a properly phase reversed reference signal of twice the subcarrier frequency and the brightness signal, $E_Y$. The output of the secondary modulator 203 is applied to an adder circuit 204 for combination with the original composite signal $E_C$ after which the combined signals are applied to the demodulator 201. Referring to FIG. 2, the reference signal of twice the subcarrier frequency for the secondary modulator, approximately 7.16 mHz., is modulated in 203 with the brightness signal $E_Y$ to produce lower sideband modulation components C of FIG. 2D. Then this modulation of the second harmonic of the reference signal beats with the reference signal in demodulator 201 and that lower sideband is represented as C′ in FIG. 2E. The upper sideband thereof is ignored since it falls outside of the passband of filter 202. The energy spectrum C′ is seen to be equal and opposite in phase to the energy spectrum S of the spurious signal so that these two offset one another in the demodulator 201.

This operation may be understood mathematically as follows:

$$(6)\quad (E_C-2E_Y\cos 2\omega t)G(t)_R=\Delta T/T(E_Y+K_1(E_R-E_Y)\cos\omega t+K_2(E_B-E_Y)\sin\omega t+2A_1E_Y\cos\omega t+A_1K_1(E_R-E_Y)+A_1K_1(E_R-E_Y)\cos 2\omega t+\text{other components}-2E_Y\cos 2A_1E_Y\cos\omega t)$$

In Equation 6 the first through sixth terms are the same as those of Equation 5. The seventh term includes the components in the seventh term of Equation 5 plus additional products that can be filtered or treated with the others specified. The eighth term of Equation 6 is a product due to the addition of the cancelling signal but it is at a frequency beyond the video range of interest and can be filtered in filter 202. The ninth term of Equation 6 is seen to be equal and opposite to the spurious signal represented by the fourth term of Equation 6 so that these two cancel one another. This operation is represented graphicaly by FIG. 2E in which the energy band S represents the spurious signal and the energy band C′ represents the offsetting signal produced in the primary demodulator 201 when it is fed with the signal from the secondary modulator 203.

In the case of demodulators for the blue and green representative signals, the demodulator unbalance would be suitably modified, the coefficients are different and the phase is $2\omega t+146°$ for the green representative signal and sine $2\omega t$ for the blue representative signal.

In the specific circuitry of FIG. 5 the demodulated composite video signal is coupled from the amplifier 17 to the base electrode of a transistor 60 in the phase splitter 62. DC bias for the base electrode is provided by a voltage divider 63. Suitable output load impedances 64 and 65 are connected respectively to the emitter and collector electrodes of the transistor 60. Opposite phases of the composite video signal are coupled to the emitter follower stages 70 and 72 which develop the signal across the emitter load resistor 73 and emitter load resistor 74, respectively. The composite video signal of one phase is applied from the load resistor 73 to the cathode of diode 75 and the video signal of opposite phase is applied from a variable tap of resistor 77 to the cathode of the diode 78. The anodes of diodes 75 and 78 in detector 20B are respectively connected to opposite terminals of a transformer winding 80 which is coupled to a winding 80A. The winding 80A is connected to the terminal 50 of the reference oscillator source 46 to provide an effective switching voltage for the diodes 75 and 78 to render these diodes conductive during opposite phases of the reference signal. The diodes 75 and 78 are connected in a "balanced" demodulator circuit with some amount of unbalance provided by the setting of a variable resistor 77.

Briefly the operation of circuitry associated with diodes 75 and 78 to demodulate the chrominance modulated subcarrier involves alternate conduction of the diodes 75 and 78 due to the reference oscillator signal from circuit 46, and these diodes alternately conduct opposite phases of the applied video signal. Since the reference oscillator signal applied through winding 80A has a particular fixed phase relation with respect to the subcarrier frequency, the conduction of diodes 75 and 78 represents the amplitude vairations of that particular phase of the subcarrier as the output signal is applied to the filter 82.

Output signals are derived from a tap of the winding 80 and coupled through the filter 82 to the red representative signal amplifier 22. Filter 82 includes a low pass section 82A having series inductors and shunt capacitors, and a further bridge-type low pass network 82B in order to effectively define a bandwidth of zero to 2 or 3 megacycles for translating the red color representative signal and any high frequency components extending out to the maximum range of luminance signal being received. The filter 82 removes such signals as the 3.58 (approx.) reference signals applied from the oscillator 46.

It may also be seen that the luminance components of the composite video signal are applied to the demodulator 20B. Normaly these luminance components would be balanced out in causing equal and opposite conduction of the diodes 75 and 78. However, conduction of the luminance components by the diodes is made unequal by adjustment of variable resistor 77 so that a selected amplitude of the luminance components is not balanced out in the circuit. Variable resistor 77 is set so that a precise value of the luminance components exists for the amount of the luminance component associated with the demodulated chrominance components resulting in a color representative signal to be translated from the demodulator 20B.

In order to reduce or remove the brightness and reference signal product which is spurious, the input circuit 20A includes a secondary modulator circuit coupled between the output of amplifier 17 and the input to the phase splitter circuit 62. This signal path is effectively in shunt with a series input impedance comprising capacitor 120 and resistor 121.

The demodulated video signal at the output of amplifier 17 is applied to the phase splitter stage 125 having a transistor 126 with collector and emitter electrodes providing opposite phases of this video signal. The output signals of phase splitter 125 are applied to the balanced detector 130 which is controlled by a switching signal from the frequency doubler 132. The doubler 132 is coupled to the terminal 50 of the reference oscillator source 46 so that a 7.16 (approx.) megacycle signal is modulated by the $E_Y$ video signal in the circuit 130. Frequency doubler 132 provides a phase locked signal of precisely twice the frequency of the signal appearing at terminal 50. The output of the balanced detector 130 is supplied through a 7.16 megacycle trap 135 to the emitter follower 136 having a transistor 138. The emitter circuit of transistor 138 is coupled through a filter network 140 to the base of the phase splitter transistor 60. Filter 140 defines a bandwidth which selects the lower frequency sideband components of the 7.16 megacycle reference signal from about 3.7 mc. to 7.16 mc.

Thus, the output of the spurious signal cancelling network 125, 130, 136 and 140 is a range of sideband modulation components formed by the luminance signal and these beat with the reference carrier in detector 20B to produce an equal and opposite energy curve C′ (FIG. 2E) as compared to curve S in order to cancel the spurious signal. The phase and frequency of the signal from doubler 132 adn the polarity of the diodes in demodulator 130 insure the proper cancelling relation.

Looking at the operation another way, the generated cancelling sideband C together with the sidebands of curve S made by the original luminance components conducted through elements 120 and 121, form a double sideband signal in phase quadrature with the reference signal at terminal 50. Since the demodulator circuit 20B does not respond to signals in quadrature with the reference signal applide thereto, the described spurious luminance components, represented by curve S in FIG. 2E, are eliminated in the output of the demodulation system.

In the circuit of FIG. 5 a portion of the brightness video signal, $E_Y$, is available in the demodulator due to the unbalance of the circuit 72. This of course means that the brightness signal, $E_Y$, is available for proper demodulation with the subcarrier wave to directly produce a color representative signal. Accordingly control of variable resistor 77 adjusts the level of the $E_Y$ signal with respect to the color subcarrier for compensating the demodulator efficiency and the coefficients of the composite video signal.

To derive correct information from the signal without unbalancing to adjust $E_Y$, the constants A should be 1.14 for red, 2.03 for blue and 0.70 for green. Whereas the green representative signal can be demodulated without special techniques, the red and blue representative signals require special handling in order to establish the proper ratio of brightness signal to color representative signal to end up producing a video signal representative of brightness, hue and saturation for application to the tri-beam picture tube 30. In a gating signal for a balanced demodulator, rather than one unbalanced to adjust $E_Y$, consider the A constants to represent the coefficient of a Fourier expansion of the gating function. If the gate signal is assumed to be rectangular (as it may be for practical purposes if it has sufficient amplitude, even though it may be a sine wave) the coefficients can be represented as:

$$A_n=\frac{\sin(n\pi F)}{n\pi F} \tag{7}$$

where F=the duty cycle of the gate pulse. Since this function has a maximum value of unity, a technique must be used to effectively achieve a K over one in the signal.

Changing the K coefficients in the signal is done by adjusting the amplitude of the subcarrier wave with respect to the brightness components below the band of the subcarrier. FIG. 6 illustrates a circuit to achieve this in place of unbalancing the modulator 70 of FIG. 5.

In FIG. 6 the amplifier 17 couples the composite brightness and subcarrier signal to a bandpass filter 150 which selects the carrier wave, and to a low pass filter 152 which passes the brightness component. The filters 150 and 152 have constant and equal time delays. The output of filter 150 is coupled to an amplifier 154 and from there to the adder circuit 156. The output of filter 152 is also coupled to resistive adder circuit 156 and to the base electrode of transistor 126 in the circuit of FIG. 5. Amplifier 154 provides sufficient gain to bump or step up the subcarrier signal with respect to the brightness signal $E_Y$ that is developed at terminal 160. Terminal 160 is connected to demodulator 20C. Terminal 162 is connected to transistor 60 and provides a step proper for the red representative signal. Terminal 164, being tapped down further on the output divider 165 of the adder circuit 156, provides a still further reduced step of subcarrier suitable for driving the green signal demodulator. The fact of increased brightness signal level in the range of the subcarrier, that is above the lower cutoff of the filter 150, is normally offset by the reduced response of the filter at the output of each demodulator (filter 202 or filter 82).

The circuit of FIG. 6 can be used to drive the demodulators 20B, 20C and 20D of FIG. 1 each with the proper ratio of subcarrier wave to brightness signal so that the values of the K constant are effectively increased to the point that the products with the A constants can be 1. The output of the low pass filter 152 could also provide the brightness components to each of the secondary modulators associated with the demodulators 20B, 20C and 20D and corresponding to the circuitry 126, 130, 136, 140 and 132 of FIG. 5 or to 203 in FIG. 4 (if 201 were fully balanced).

The above described demodulation system directly produces color representative signals without the production of spurious signals normally associated with translation of the luminance components in a demodulator for the subcarrier wave. In this way the brightness components need not be separately translated at high level for matrixing or application to the color picture tube thus improving the receiver and permitting the adjustment of simply the direct color representative signals on the image reproducer during construction and alignment of the receiver. The system is also operative with signals at intermediate frequency if suitable filters are used to select the signal components. While it may appear at first glance that the overall demodulation system includes a great number of components, it will be recognized by those skilled in the art that certain modifications and simplifications can be made within the teachings hereof and that the system lends itself to advance solid state production techniques for practical use.

I claim:

1. A color television demodulation system having a circuit for supplying a color television signal including video frequency brightness components in a given frequency range and a subcarrier wave modulated in amplitude and phase to represent color information, and an oscillator circuit providing a signal of the subcarrier frequency at a selected phase for demodulating the subcarrier wave, said demodulation system including in combination:

a demodulator circuit including electron control means coupled to the oscillator circuit to be controlled in conduction at the selected phase, input circuit means applying the color television signal including the video frequency components and the subcarrier wave to said electron control means to develop directly a video signal representing brightness, hue and saturation and further developing a spurious signal within the given frequency range from modulation of the oscillator signal by the video frequency components, and a spurious signal cancellation circuit coupled to said demodulator circuit and including further electron control means controlled by the oscillator circuit and the video frequency components to develop a cancellation signal for the spurious signal.

2. The demodulation system of claim 1 further including means for establishing a selected ratio of the amplitude of the video frequency brightness components to the amplitude of the subcarrier wave to compensate for the ratio thereof in said color television signal.

3. The combination of claim 2 in which said means for establishing a selected ratio is a partially balanced demodulator in said demodulator circuit.

4. The combination of claim 2 in which said means for establishing a selected ratio includes frequency selection means for the video frequency components and frequency selection means for the subcarrier wave and means for combining signals from both of said frequency selection means with selected amplitudes and applying the same to said input circuit means.

5. The combination of claim 1 in which said electron control means are diodes and in which said demodulator circuit includes a low pass output filter for selecting the video signal from said demodulator system.

6. The demodulation system of claim 1 in which said spurious signal cancellation circuit is a secondary modulator for the video frequency brightness components and a signal controlled by said oscillator circuit, said secondary modulator operative to produce the cancellation signal in said demodulator circuit with a phase to render the spurious signal ineffectual.

7. The demodulation system of claim 1 in which said spurious signal cancellation circuit is controlled by the oscillator circuit with a signal at twice the subcarrier frequency.

8. The demodulation system of claim 7 in which said spurious signal cancellation circuit is coupled to said input circuit means to apply the cancellation signal to said demodulator circuit whereby cancellation of the spurious signal takes place therein.

9. A color television demodulation system for utilizing a composite signal including video frequency brightness components and a subcarrier wave modulated in amplitude and phase to represent color information, said subcarrier wave having modulation components *at least partially* overlapping in frequency the brightness components, said demodulation system including in combination:

a first synchronous demodulator including an input circuit for the composite signal and means for applying thereto a control signal of the subcarrier frequency, said first demodulator also including an output circuit for the demodulated video signal representing brightness, hue and saturation information in the composite signal, the video frequency brightness components beating in said first demodulator with the control signal of subcarrier frequency to produce a spurious signal in said output circuit, and a second synchronous demodulator including means for applying thereto the video frequency brightness components and a signal phase locked to the subcarrier frequency to beat the same together to produce an offsetting signal for the spurious signal, and means for applying the offsetting signal to said first synchronous demodulator with an amplitude and phase to offset development of the spurious signal in said first synchronous demodulator.

10. A signal demodulation system, including in combination circuit means for providing a demodulated color television signal comprising video frequency luminance components in a given frequency range and a subcarrier modulated in amplitude and phase to represent color difference information and having modulation components overlapping the given frequency range, oscillator means providing three oscillator signals of the subcarrier frequency and at three different phases for demodulating three phases of the modulated subcarrier, three demodulator circuits each connected to said oscillator means to be controlled by one oscillator signal therefrom and each connected to said circuit means so that each is supplied with the luminance components and the modulated subcarrier, variable means for adjusting the relative amplitude of the luminance components and the modulated subcarrier, said demodulator circuits each detecting one phase of the modulated subcarrier and combining the same with the luminance components, the luminance components modulating the oscillator signals to produce spurious signal components within the frequency range of the luminance components in the demodulator circuit, and means responsive to the luminance components to cancel at least a portion of the spurious signal components, thereby producing three different color representative signals.

11. The demodulation system of claim 10 wherein said means responsive to the luminance components to cancel the spurious components includes a further demodulator controlled by said oscillator means to produce modulation components for rendering at least one of said demodulator circuits unresponsive to modulating the luminance components and the oscillator signal.

12. A direct color signal demodulating system including in combination, circuit means providing a demodulated color television signal comprising video frequency luminance components in a given frequency range and a subcarrier modulated in amplitude and phase to represent color difference information and having components overlapping the given frequency range, oscillator means providing an oscillator signal of the subcarrier frequency and a particular phase for demodulating one phase of the modulated subcarrier, a demodulator circuit connected to said oscillator means to be controlled by the oscillator signal therefrom and adapted to be connected to said circuit means to be supplied with the luminance components and the modulated subcarrier, said demodulator circuit being operative to produce a spurious frequency component within the frequency range of the luminance components in said demodulator circuit by modulation of the oscillator signal by the luminance frequency components, means coupling said circuit means to said demodulator circuit to apply to said demodulator circuit the luminance components and the modulated subcarrier modified in signal component content to prevent formation of the spurious frequency component in said demodulator circuit, said demodulator circuit detecting one phase of the modulated subcarrier and combining the same with the luminance components to produce a color representative signal.

References Cited

UNITED STATES PATENTS 2,917,573 12/1959 Holmes ............ 178—5.4

ROBERT L. GRIFFIN, *Primary Examiner.*

R. MURRAY, *Assistant Examiner.*